(12) United States Patent
Horiguchi et al.

(10) Patent No.: US 10,113,719 B2
(45) Date of Patent: Oct. 30, 2018

(54) DISPLAY APPARATUS

(71) Applicant: Sakai Display Products Corporation, Sakai-shi, Osaka (JP)

(72) Inventors: Yuki Horiguchi, Sakai (JP); Takayuki Nakazawa, Sakai (JP); Hiroki Azuma, Sakai (JP); Shigeyoshi Okazaki, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 16 days.

(21) Appl. No.: 15/502,967

(22) PCT Filed: Oct. 21, 2014

(86) PCT No.: PCT/JP2014/077984
§ 371 (c)(1),
(2) Date: Feb. 9, 2017

(87) PCT Pub. No.: WO2016/063358
PCT Pub. Date: Apr. 28, 2016

(65) Prior Publication Data
US 2017/0234512 A1    Aug. 17, 2017

(51) Int. Cl.
*F21V 19/00* (2006.01)
*F21V 33/00* (2006.01)
*G02F 1/1333* (2006.01)
*G02F 1/1335* (2006.01)

(52) U.S. Cl.
CPC ...... *F21V 19/0035* (2013.01); *F21V 33/0052* (2013.01); *G02F 1/133308* (2013.01); *G02F 1/133603* (2013.01); *G02F 1/133605* (2013.01); *G02F 2001/133314* (2013.01)

(58) Field of Classification Search
CPC .............. F21V 19/0035; F21V 19/0053
USPC ..................................... 362/97.1
See application file for complete search history.

(56) References Cited

U.S. PATENT DOCUMENTS

| | | | | |
|---|---|---|---|---|
| 7,566,146 B2* | 7/2009 | Jeon | ............... | G02F 1/133603 362/247 |
| 7,714,955 B2* | 5/2010 | Tsubokura | ........ | G02F 1/133604 349/58 |
| 7,944,519 B2* | 5/2011 | Lee | ............... | G02F 1/133608 349/58 |
| 8,708,545 B1* | 4/2014 | Chiu | ............... | G02B 6/0091 362/633 |
| 2006/0164829 A1* | 7/2006 | Jang | ............... | G01D 11/28 362/225 |
| 2009/0256988 A1* | 10/2009 | Kim | ............... | G02F 1/133604 349/58 |
| 2010/0085734 A1* | 4/2010 | Kim | ............... | G02F 1/133604 362/97.1 |

(Continued)

FOREIGN PATENT DOCUMENTS

JP         2007-310406 A     11/2007

*Primary Examiner* — Bryon T Gyllstrom
(74) *Attorney, Agent, or Firm* — Rudy J. Ng; Bret E. Field; Bozicevic, Field & Francis LLP

(57) ABSTRACT

A display apparatus, comprising: a display panel configured to display an image; a support plate which is disposed on a rear side of the display panel and supports a light source; and a support cylinder which is disposed between the support plate and the display panel, which is provided along an edge portion of the support plate, and which is made up of a plurality of sheet metal members.

13 Claims, 8 Drawing Sheets

(56) References Cited

U.S. PATENT DOCUMENTS

2010/0110332 A1* 5/2010 Kamada ............ G02F 1/133608
    349/62
2010/0182768 A1* 7/2010 Yun .................. G02F 1/133604
    362/97.1
2011/0182067 A1* 7/2011 Watanabe ............... F21V 5/007
    362/235
2012/0250290 A1* 10/2012 Park ................. G02F 1/133615
    362/97.1

* cited by examiner

DISPLAY APPARATUS

CROSS-REFERENCE TO RELATED APPLICATIONS

This application is the national phase under 35 U.S.C. § 371 of PCT International Application No. PCT/JP2014/077984 which has International filing date of Oct. 21, 2014 and designated the United States of America.

FIELD

The technology herein relates to a display apparatus which displays an image.

BACKGROUND AND SUMMARY

Generally, thin display apparatuses having a small occupied area are widely used in spite of a large size of a display screen thereof. The display apparatus includes, for example, a display panel, a light source for emitting light to the display panel, and a support plate for supporting the light source.

When manufacturing a display apparatus having a large display screen, a large display panel and the support plate are used. The support plate requires a strength to support the large display panel.

A display apparatus includes a rectangular chassis made of an extrusion molded- or pultrusion molded-steel pipe member. By using the cylindrical chassis, the chassis has a high strength.

In the chassis, it is necessary to form a structure (for example, protrusions or holes) for holding components such as a display panel or an optical sheet.

After extrusion molding or pultrusion molding, the steel pipe needs to be subjected to post-processing such as pressing. When the chassis is large, a dimension of the steel pipe may exceed the dimension that can be processed by a press machine.

Forming the above-described structure into the chassis by a mold used at the time of extrusion molding or pultrusion molding may also be considered. However, there are many constraints on shapes that can be molded by the mold, and it may be difficult to achieve the structure.

In consideration of the above-mentioned circumstances, it is an object of the present disclosure to provide an aspect of disclosure of a display apparatus that may form a structure for holding components such as a display panel or an optical sheet as necessary.

According to an aspect of disclosure, there is provided a display panel comprises a display panel configured to display an image, a support plate which is disposed on a rear side of the display panel and supports a light source, and a support cylinder which is disposed between the support plate and the display panel, which is provided along an edge portion of the support plate, and which is made up of a plurality of sheet metal members.

The support cylinder is provided at the edge portion of the support plate, thereby improving the strength of the support plate. In addition, the support cylinder is made up of a plurality of sheet metal members, such that a structure for holding components such as the display panel or an optical sheet may be easily formed in the support cylinder by such as pressing or cutting and raising the sheet metal members.

According to another aspect of disclosure, the support cylinder includes: one sheet metal member with a cross section formed in a hook shape in an axial direction of the support cylinder; and a different sheet metal member with a cross section formed in an L shape or a crank shape in the direction, so as to cover an opening portion of the one sheet metal member.

By pressing or bending a flat sheet metal, the one sheet metal member with a cross section formed in the hook shape; and the different sheet metal member with a cross section formed in the L shape or the crank shape are manufactured and combined with each other, thus to manufacture the support cylinder.

According to another aspect of disclosure, a panel support part is provided between the support cylinder and the display panel to support the display panel, the one sheet metal member is provided with a holding hole configured to hold the panel support part, and the panel support part has a fitting part which is fitted to the holding hole.

When manufacturing the one sheet metal member, the holding hole for holding the panel support part is formed in the one sheet metal member. The fitting part is fitted to the holding hole, and the panel support part is held by the support cylinder.

According to another aspect of disclosure, a panel support part is provided between the support cylinder and the display panel to support the display panel, the one sheet metal member has a positioning protrusion configured to position the panel support part, and the panel support part is provided with a positioning hole with which the positioning protrusion is engaged.

When manufacturing the one sheet metal member, the positioning protrusion engaging with the positioning hole is formed in the one sheet metal member.

According to another aspect of disclosure, an optical sheet is provided between the support cylinder and the display panel, and a holding axis holding the optical sheet penetrates the support cylinder in a front-rear direction.

When manufacturing the support cylinder, the holding axis is formed in the support cylinder.

According to another aspect of disclosure, the support plate is made up of a plurality of plate members.

Since the support plate is made up of the plurality of plate members, the support plate may be manufactured even when having a large size.

In accordance with the display apparatus according to the present invention, the support cylinder is provided at the edge portion of the support plate, thereby improving the strength of the support plate. In addition, the support cylinder is made up of the plurality of sheet metal members, such that the structure for holding components such as the display panel or the optical sheet may be easily formed in the support cylinder by such as pressing or cutting and raising the sheet metal members.

The above and further objects and features will more fully be apparent from the following detailed description with accompanying drawings.

DETAILED DESCRIPTION OF NON-LIMITING EXAMPLE EMBODIMENTS

Embodiment 1

Figure 1:
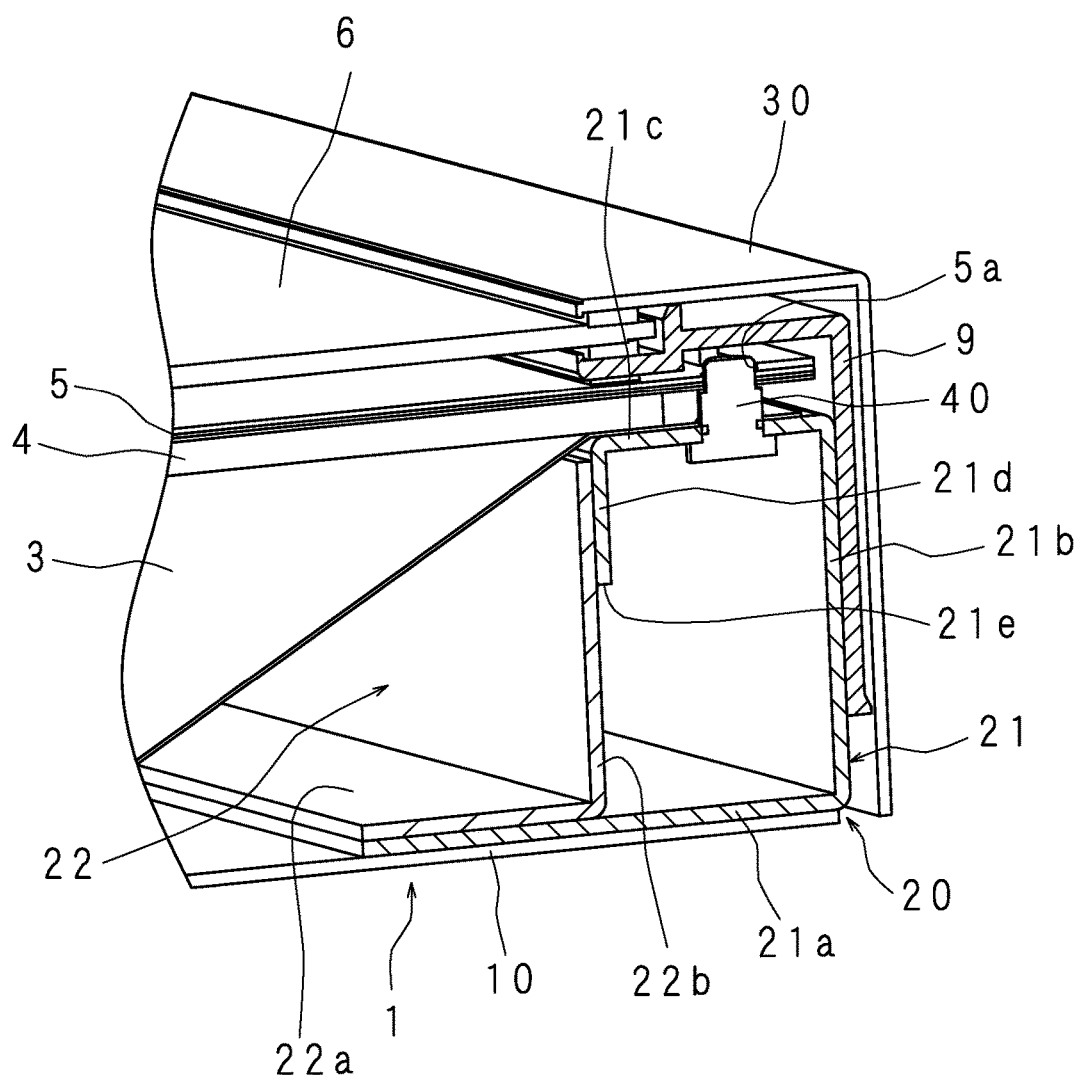
FIG. 1 is a partial side cross-sectional view schematically illustrating a display apparatus according to Embodiment 1.
Figure 2:
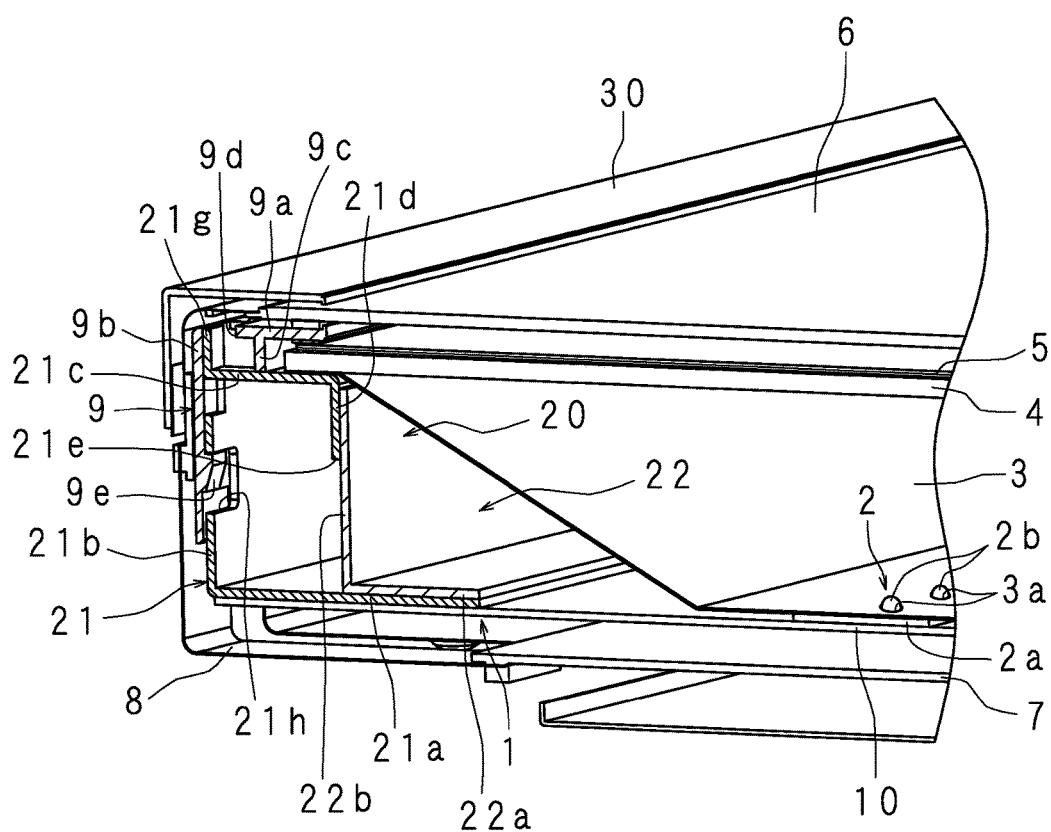
FIG. 2 is a partial plan cross-sectional view schematically illustrating the display apparatus.

Hereinafter, the present invention will be described with reference to the drawings illustrating a display apparatus according to Embodiment 1. FIG. 1 is a partial side cross-sectional view schematically illustrating the display apparatus, and FIG. 2 is a partial plan cross-sectional view schematically illustrating the display apparatus.

The display apparatus includes a rectangular box-shaped backlight chassis 1 vertically disposed and opened at a front side. A light source 2 is provided on a front surface of the backlight chassis 1. The light source 2 has a plurality of light emitting diodes (LEDs) 2b and an LED substrate 2a on which the LEDs 2b are mounted on one surface thereof. The light source 2 is fixed to the front surface of the backlight chassis 1 with the LEDs 2b on the front side.

A reflection sheet 3 is disposed on the front side of the light source 2. The reflection sheet 3 is provided with a plurality of insertion holes 3a. The LEDs 2b are inserted into the insertion holes 3a, and the LEDs 2b protrude forward from the insertion holes 3a. Light of the LEDs 2b reflected on the reflection sheet 3 progresses forward.

A diffusion plate 4 for diffusing the light is provided on the front side of the reflection sheet 3. A plurality of optical sheets 5 are provided on the front surface of the diffusion plate 4 and overlap with the diffusion plate 4. The optical sheets 5 perform diffusion or collecting, etc. of the light. A display panel 6 is provided on the front side of the optical sheets 5. The display panel 6 has one glass substrate on the front side and a different glass substrate on a back side, and a liquid crystal is sealed between the two glass substrates. The display panel 6 is configured to control a voltage applied to the liquid crystal so as to adjust transmittance of light. The light of the LEDs 2b passes through the diffusion plate 4, the optical sheets 5 and the display panel 6, and an image is displayed on the display panel 6.

A control board 7 is provided on a back surface of the backlight chassis 1. The control board 7 is connected to the display panel 6 through a flexible substrate 8. The control board 7 controls driving of the display panel 6.

Figure 3:
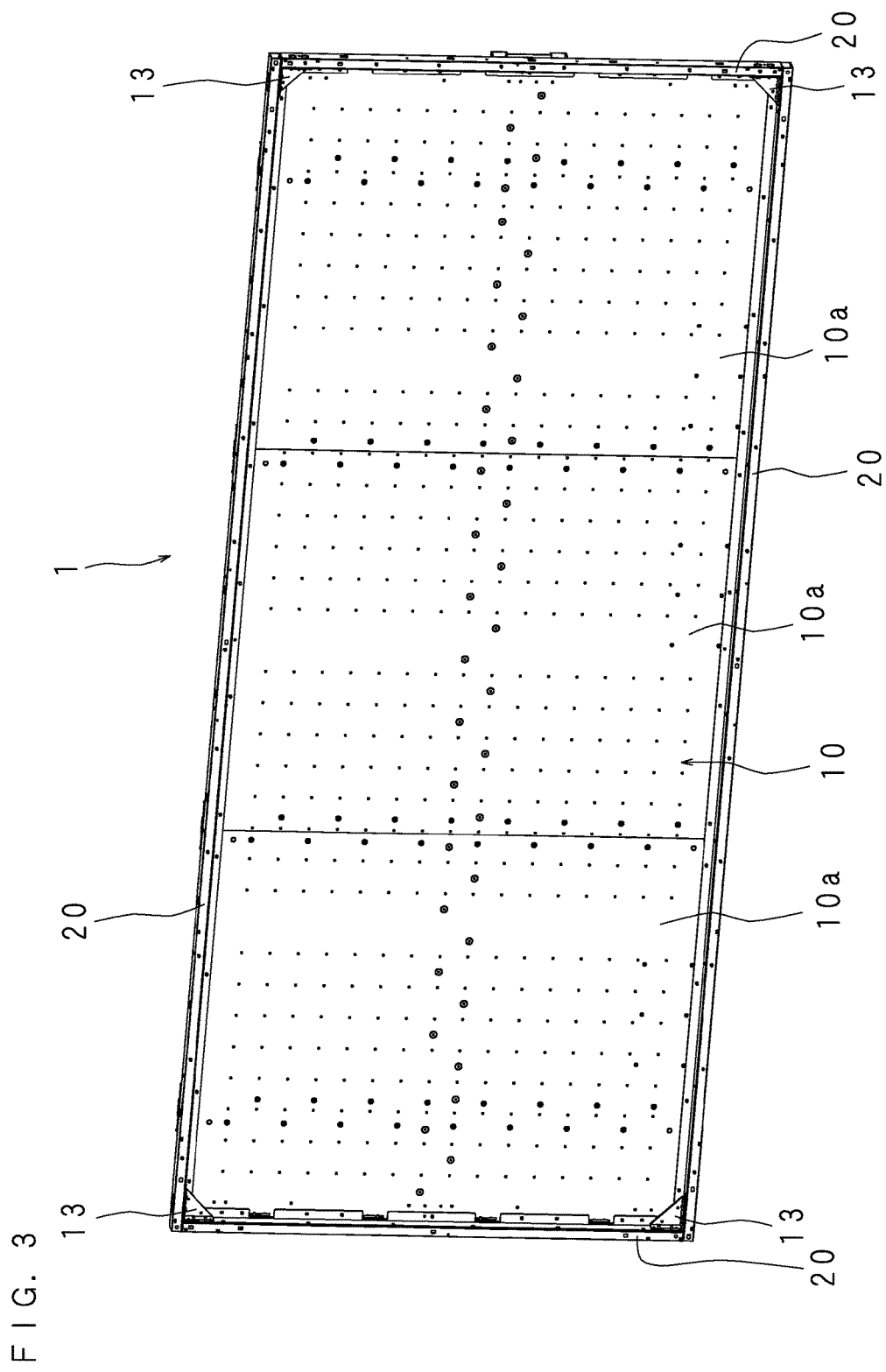
FIG. 3 is a schematic perspective view illustrating a backlight chassis viewed from a front side.
Figure 4:
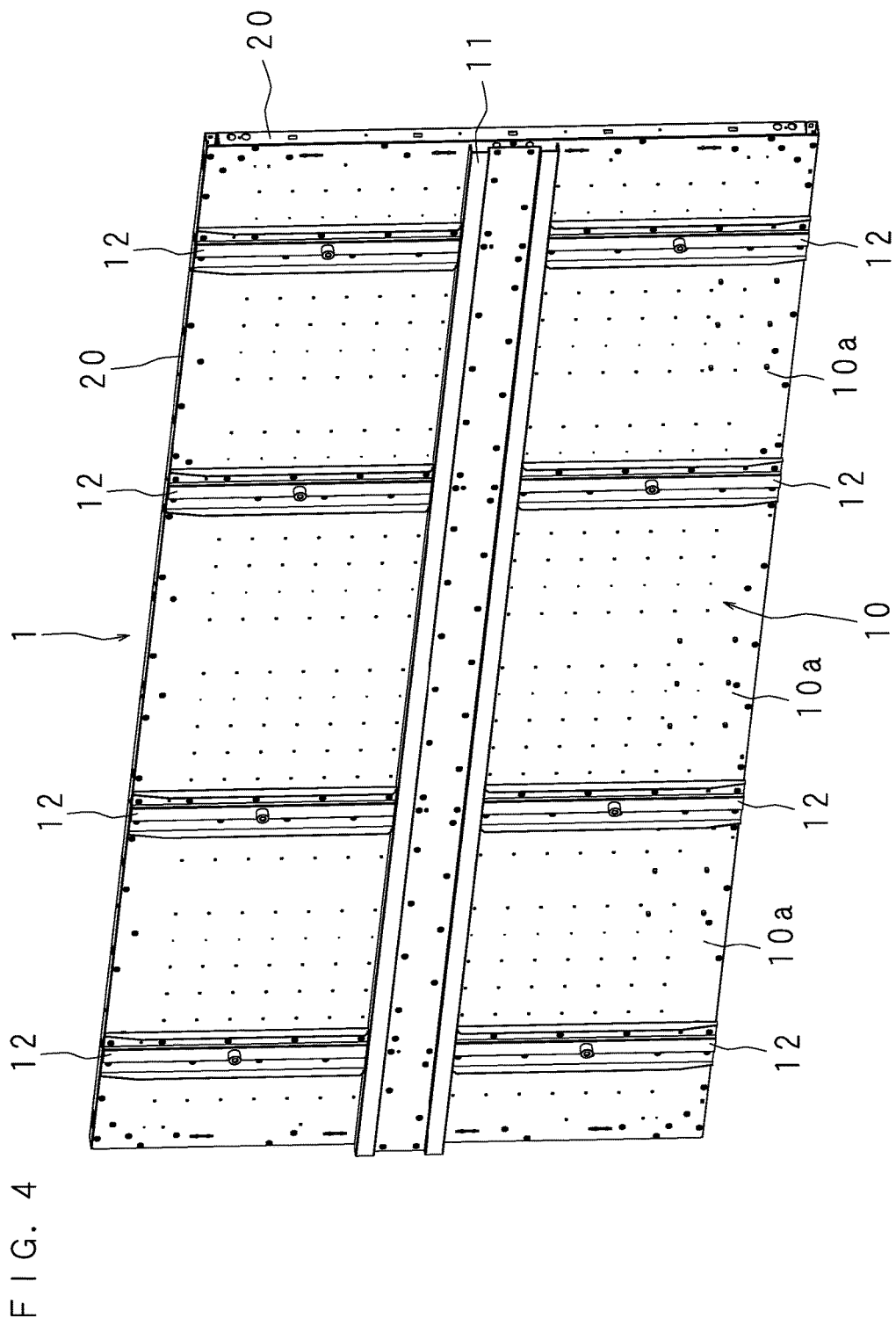
FIG. 4 is a schematic perspective view illustrating the backlight chassis viewed from a rear side.

FIG. 3 is a schematic perspective view illustrating the backlight chassis 1 viewed from the front side, and FIG. 4 is a schematic perspective view illustrating the backlight chassis 1 viewed from a rear side.

The backlight chassis 1 includes a laterally long rectangular support plate 10, and four support cylinders 20, 20, 20 and 20 which extend along a front surface edge portion of the support plate 10 and are provided at the front surface edge portion. The support plate 10 has a plurality of (three in the present embodiment) plate members 10a, 10a and 10a. The plate members 10a are arranged in a lateral direction. The plurality of plate members 10a are connected with each other by two support cylinders 20 provided on the upper and lower edge portions of the support plate 10. The light source 2 is supported on the front surface of the support plate 10.

Lateral reinforcement rods 11 elongated laterally are attached to a vertical central portion of the plate members 10a across the plurality of plate members 10a. A plurality of longitudinally long longitudinal reinforcement rods 12 elongated longitudinally are provided on the rear side of the plate member 10a. On the upper side and the lower side from the lateral reinforcement rods 11, the longitudinal reinforcement rods 12 are attached to adjacent portions of the plate members 10a and 10a, respectively. In addition, the longitudinal reinforcement rods 12 are also attached to the respective back surfaces of the two plate members 10a and 10a located on both sides. The support plate 10 is reinforced by the lateral reinforcement rods 11 and the longitudinal reinforcement rods 12.

Figure 5:
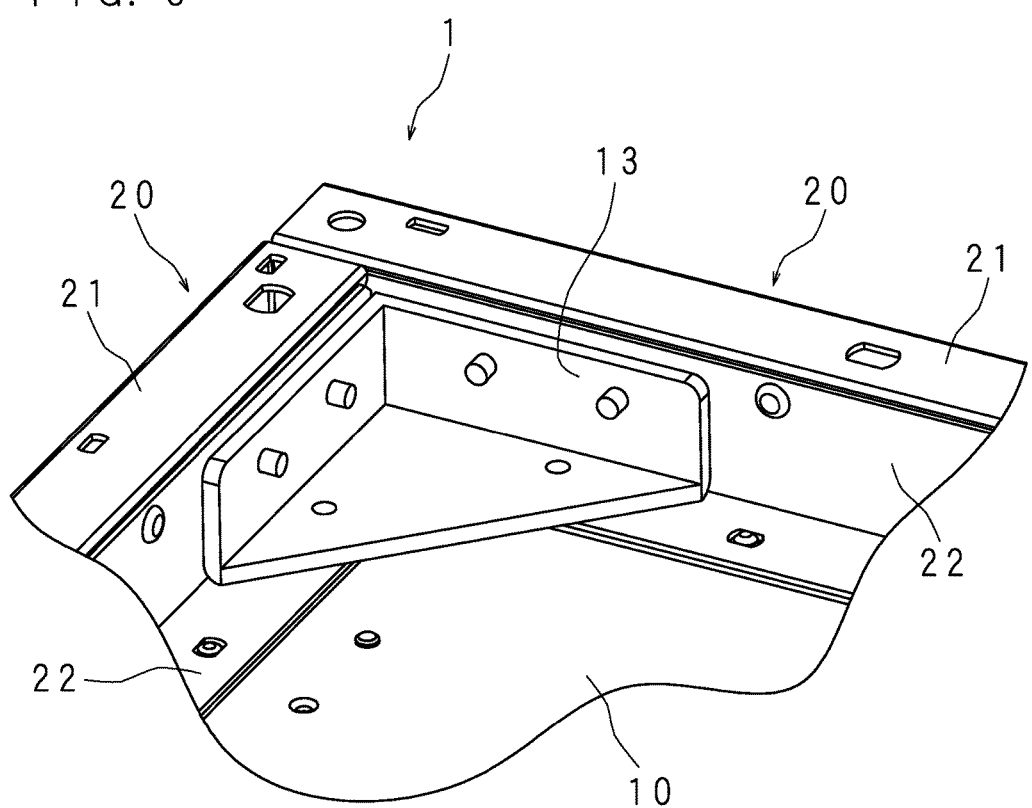
FIG. 5 is a partial enlarged perspective view schematically illustrating a corner portion of the backlight chassis.
Figure 6:
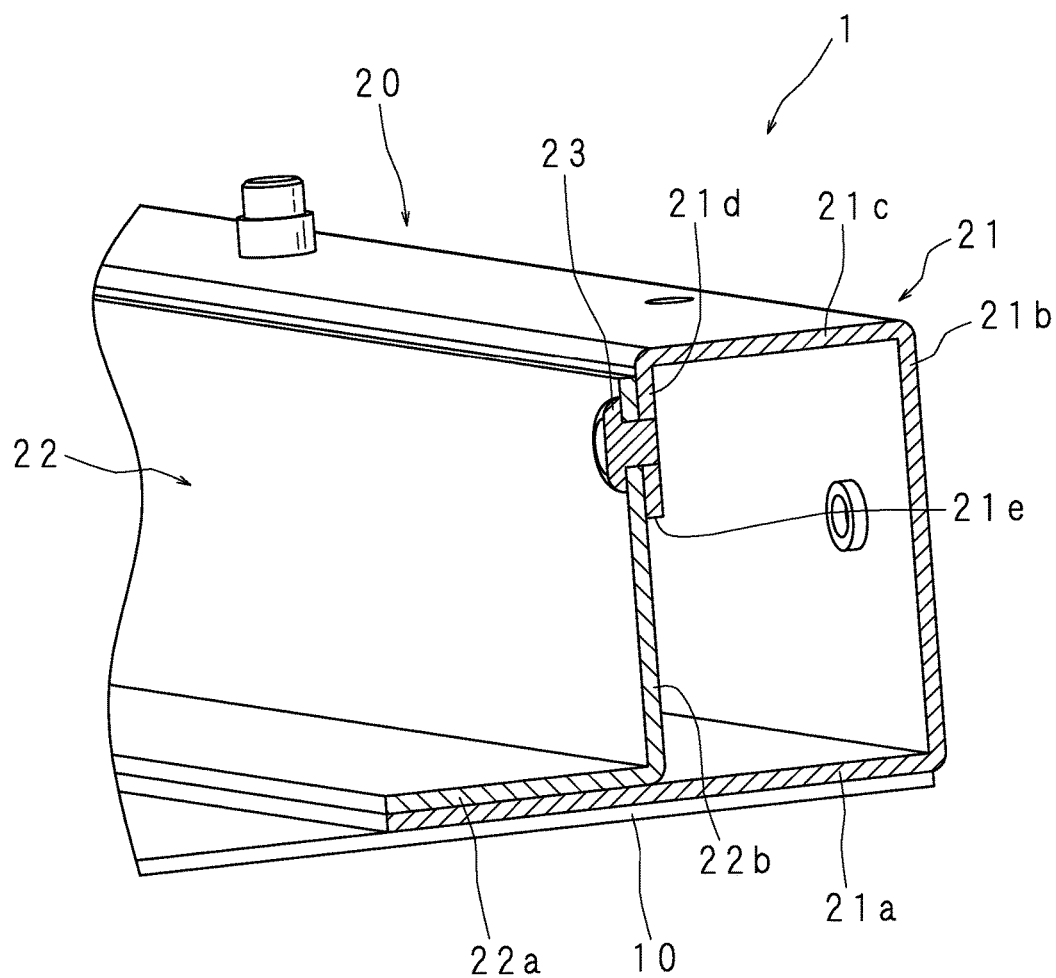
FIG. 6 is a partial enlarged cutaway perspective view schematically illustrating an edge portion of the backlight chassis.

FIG. 5 is a partial enlarged perspective view schematically illustrating a corner portion of the backlight chassis 1, and FIG. 6 is a partial enlarged cutaway perspective view schematically illustrating an edge portion of the backlight chassis 1.

The four support cylinders 20 are provided on each of four sides of the support plate 10, and the end portions of the two support cylinders 20 and 20 are orthogonal to each other at the corner portion of the support plate 10. A corner reinforcement part 13 formed in a right-angled triangular shape is provided at the orthogonal portion of the support cylinders 20 and 20. The support cylinders 20 are connected to each of two side portions other than an inclined side portion of the corner reinforcement part 13. The support cylinders 20 are reinforced by the corner reinforcement part 13.

The support cylinder 20 includes a first member 21 (one sheet metal member) with a cross section formed in a hook shape on a cutting face parallel to a direction orthogonal to the axial direction of the support cylinder 20, and a second member 22 (a different sheet metal member) with a cross section formed in an L-shape on a cutting face parallel to a direction orthogonal to the axial direction. The first member 21 and the second member 22 are formed by pressing the sheet metal member.

The first member 21 includes an attachment plate part 21a attached to the front surface of the support plate 10, a first protrusion plate part 21b which protrudes forward from an outer edge portion of the attachment plate part 21a and is substantially perpendicular to the attachment plate part 21a, a parallel plate part 21c which protrudes substantially parallel to the attachment plate part 21a from an protrusion end portion of the first protrusion plate part 21b and faces the attachment plate part 21a, and a second protrusion plate part 21d which protrudes rearward from a protrusion end portion of the parallel plate part 21c and is substantially perpendicular to the parallel plate part 21c. An opening 21e is formed between the second protrusion plate part 21d and the attachment plate part 21a. Further, a width dimension of the parallel plate part 21c (the dimension in a direction orthogonal to the axial direction and a front-rear direction of the support cylinder 20) is shorter than the width dimension of the attachment plate part 21a.

The second member 22 includes a base plate part 22a which is attached to the attachment plate part 21a and is substantially parallel to the attachment plate part 21a, and a connection plate part 22b which protrudes forward from an outer edge portion of the base plate part 22a at substantially a right angle thereto and is connected to the second protrusion plate part 21d. The connection plate part 22b is connected to the second protrusion plate part 21d by a rivet 23 so as to cover the opening 21e from an outside of the first member 21. The rivet 23 is press-fitted to the connection plate part 22b and the second protrusion plate part 21d. The base plate part 22a protrudes to a side opposite to the first protrusion plate part 21b and is fixed to the attachment plate part 21a by welding.

In addition, the connection plate part 22b and the second protrusion plate part 21d may be connected by screws or welding. Further, the base plate part 22a and the attachment plate part 21a may be connected by the rivets 23 or screws.

As illustrated in FIG. 2, a holding hole 21h for holding a panel chassis 9 to be described below is formed in the first protrusion plate part 21b. The parallel plate part 21c is provided with a positioning piece 21g (positioning protrusion) for positioning the panel chassis 9 to be described below. The positioning piece 21g protrudes forward, and is formed by cutting and raising the first member 21.

As illustrated in FIG. 2, the panel chassis 9 (panel support part) for supporting the display panel 6 is provided at the outside of the parallel plate part 21c and the first protrusion plate part 21b. The panel chassis 9 includes a front plate part 9a facing the parallel plate part 21c, a side plate part 9b which faces the first protrusion plate part 21b and is perpendicular to the front plate part 9a, and a spacer part 9c which protrudes rearward from the front plate part 9a. The spacer part 9c abuts the parallel plate part 21c.

A positioning hole 9d is provided near the side plate part 9b of the front plate part 9a. A position of the positioning hole 9d corresponds to the position of the positioning piece 21g. The side plate part 9b is provided with a fitting part 9e to be fitted to the holding hole 21h. The fitting part 9e protrudes toward the first protrusion plate part 21b. The positioning piece 21g is inserted into the positioning hole 9d. The position of the fitting part 9e corresponds to the position of the holding hole 21h. The fitting part 9e is fitted to the holding hole 21h.

An edge portion of the reflection sheet 3 is inclined so as to protrude forward. The edge portion of the reflection sheet 3 is provided on the front surface of the parallel plate part 21c, and is sandwiched between the diffusion plate 4 and the parallel plate part 21c.

A space is secured between the front plate part 9a and the parallel plate part 21c by the spacer part 9c, and the diffusion plate 4 is inserted into this space. A display panel 6 is provided on the front surface of the front plate part 9a. A rectangular front frame 30 is provided on the front side of the display panel 6, and the display panel 6 is sandwiched between the front frame 30 and the front plate part 9a.

As illustrated in FIG. 1, a stud bolt 40 (holding axis) penetrates the parallel plate part 21c at an upper part of the display apparatus. The stud bolt 40 is press-fitted to the parallel plate part 21c. The stud bolt 40 is located at the upper side from the diffusion plate 4. An upper edge portion of the optical sheet 5 extends upward from an upper edge portion of the diffusion plate 4, and a through hole 5a is provided in the upper edge portion of the optical sheet 5. The optical sheet 5 is disposed on the front surface of the diffusion plate 4 so that the stud bolt 40 is inserted into the through hole 5a.

In the display apparatus according to Embodiment 1, the support cylinders 20 are provided on the edge portion of the support plate 10 to improve a strength of the support plate 10. In addition, since the support cylinder 20 is made up of a plurality of sheet metal members (the first member 21 and the second member 22), a structure for holding components such as the display panel 6 or the optical sheet 5 may be easily formed by such as pressing or cutting and raising the sheet metal member.

Further, by pressing or bending the flat sheet metal, the first member 21 having the hook-shaped cross section and the second member 22 having the L-shaped cross section are manufactured and combined with each other, thus to manufacture the support cylinder 20. By using the sheet metal, the support cylinder 20 may be easily manufactured even if it has a complicated shape.

Further, when manufacturing the first member 21, the holding hole 21h for holding the panel chassis 9 may be formed by press molding.

Furthermore, when manufacturing the first member 21, the positioning piece 21g engaging with the positioning hole 9d may be formed by press molding. Further, the positioning piece 21g may be formed by cutting and raising. The reason is that the positioning piece 21g cannot be formed by extrusion molding or pultrusion molding.

After cutting and raising one flat plate-shaped sheet metal member and forming holes therein, the sheet metal member is pressed (bent), thereby manufacturing the first member 21 having the hook-shaped cross section. On the other hand, when forming a cylindrical member by extrusion molding or pultrusion molding, and then subjecting the member to pressing to manufacture the first member 21, it is necessary to manufacture a mold having a complicated shape, as well as a complicated operation of inserting the cylindrical member into the mold is required. It is practically difficult to manufacture the first member 21 by the above-described method, thereby causing an increase in manufacturing costs. In order to form protruded portions or holes in the cylindrical member, in reality, it is necessary to sequentially cut and raise or form the holes for each side in the cross section.

Further, when manufacturing the support cylinder 20, the stud bolt 40 may penetrate the support cylinder 20 (the first member 21) by press fitting. In the case of extrusion molding or pultrusion molding, forming a shape, into which the stud bolt 40 is press-fitted, is required in the mold. However, it is difficult to form the above-described shape in the mold. Further, since the support plate 10 includes a plurality of plate members 10a, the support plate 10 may be manufactured even when having a large size.

When the edge portion of the support plate 10 is bent, the strength of the backlight chassis 1 may be improved. However, in this case, processing costs are increased. Since the support plate 10 in the present embodiment has a flat shape, processing costs may be reduced.

Although the light source 2 in Embodiment 1 is a direct type, an edge light type having a light guide plate may be used for the light source 2. Further, the plurality of support cylinders 20 may be arranged on one side of the support plate 10 by shortening an axial dimension of the support cylinder 20.

Embodiment 2

Figure 7:
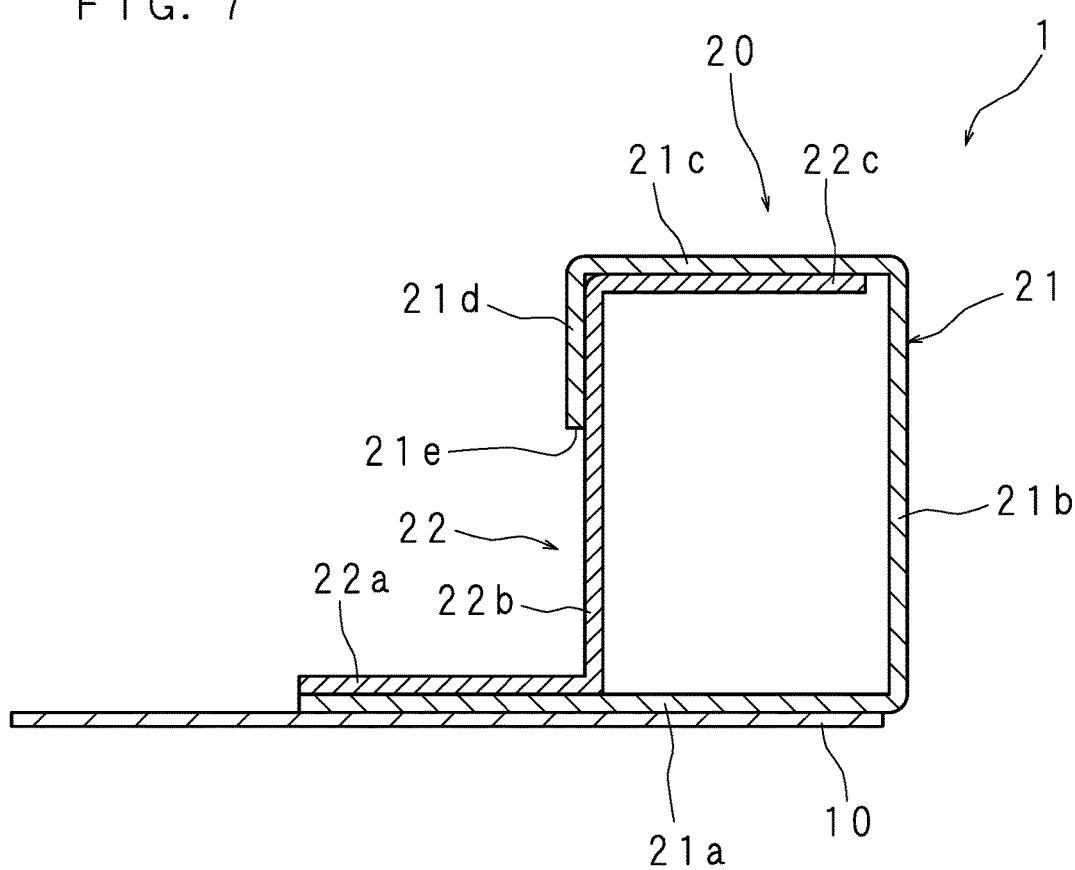
FIG. 7 is a partial enlarged cross-sectional view schematically illustrating an edge portion of a backlight chassis of a display apparatus according to Embodiment 2.

Hereinafter, the present invention will be described with reference to the drawings illustrating a display apparatus according to Embodiment 2. FIG. 7 is a partial enlarged cross-sectional view schematically illustrating an edge portion of a backlight chassis 1.

A support cylinder 20 includes a first member 21 with a cross section formed in a hook shape, and a second member 22 with a cross section formed in a crank shape. The second member 22 includes the base plate part 22a, the connection plate part 22b, and a front plate part 22c which protrudes from a front end portion of the connection plate part 22b to a side opposite to the base plate part 22a.

The connection plate part 22b is connected to the second protrusion plate part 21d so as to cover the opening 21e from an inside of the first member 21. The front plate part 22c is substantially parallel to the parallel plate part 21c, and is located on the rear side of the parallel plate part 21c. Since the crank-shaped second member 22 has more bent portions than the L shape, the strength of the support cylinders 20 may be further improved.

The same parts of the configuration according to Embodiment 2 as those of the configuration in Embodiment 1 will be denoted by the same reference numerals, and will not be described.

Embodiment 3

Figure 8:
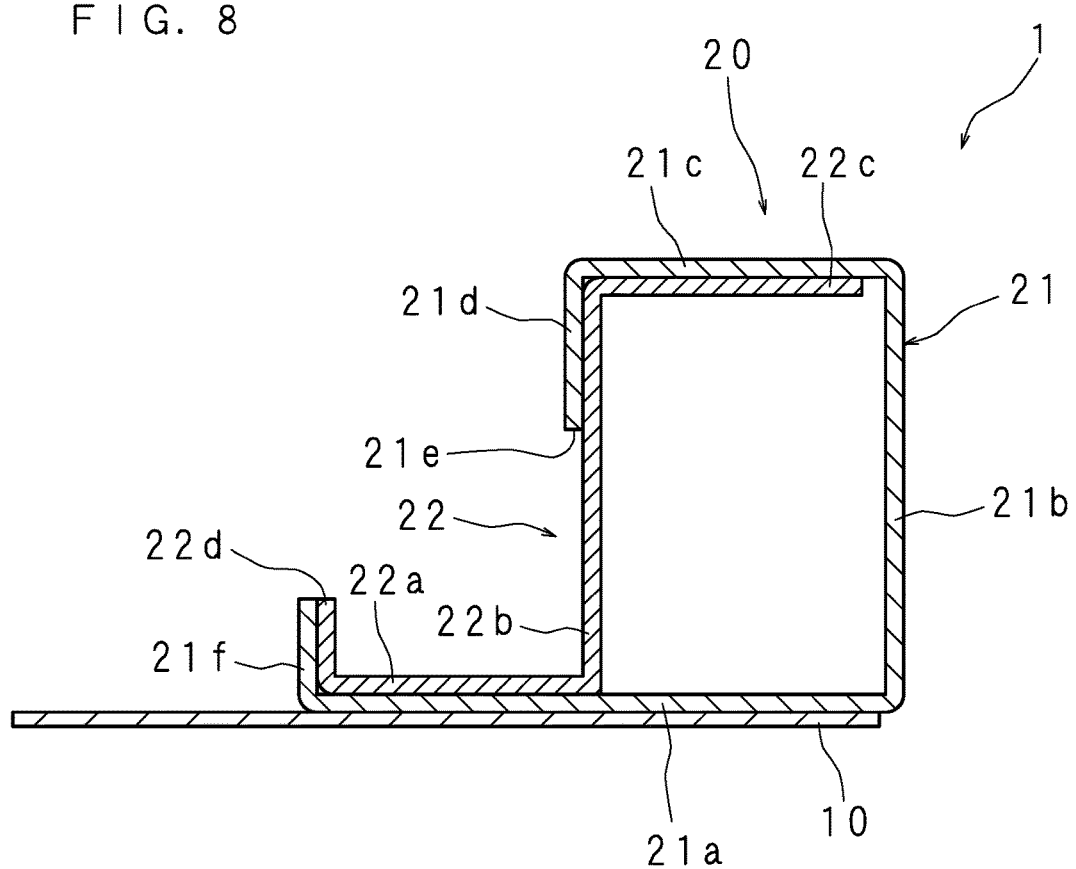
FIG. 8 is a partial enlarged cross-sectional view schematically illustrating an edge portion of a backlight chassis of a display apparatus according to Embodiment 3.

Hereinafter, the present invention will be described with reference to the drawings illustrating a display apparatus according to Embodiment 3. FIG. 8 is a partial enlarged cross-sectional view schematically illustrating an edge portion of a backlight chassis 1. A support cylinder 20 includes a first member 21 with a cross section formed in a hook shape, and a second member 22 with a cross section formed in a crank shape.

The first member 21 includes a third protrusion plate part 21f which protrudes forward from an inner edge portion of the attachment plate part 21a (edge portion on the side opposite to the first protrusion plate part 21b). The second member 22 includes a rear protrusion plate part 22d which protrudes forward from an inner edge portion of the base plate part 22a at substantially a right angle thereto. The rear protrusion plate part 22d is located nearer the second protrusion plate part 21d than the third protrusion plate part 21f, and is substantially parallel to the third protrusion plate part 21f. The rear protrusion plate part 22d is adjacent to the third protrusion plate part 21f.

The third protrusion plate part 21f is located at an inner end portion of the first member 21. The rear protrusion plate part 22d is located at an inner end portion of the second member 22. The first member 21 and the second member 22 are adjacent to each other by bending the inner end portions thereof, such that the strength of the support cylinders 20 may be further improved.

The same parts of the configuration according to Embodiment 3 as those of the configuration in Embodiments 1 and 2 will be denoted by the same reference numerals, and will not be described.

It is to be noted that, as used herein and in the appended claims, the singular forms "a", "an", and "the" include plural referents unless the context clearly dictates otherwise.

It should be understood that the embodiments disclosed herein are illustrative and non-restrictive in every respect. The technical features described in the examples may be combined with one another, while all changes that fall within metes and bounds of the claims, or equivalence of such metes and bounds thereof are intended to be embraced by the scope of the present invention.

The invention claimed is:

1. A display apparatus, comprising:
a display panel configured to display an image;
a support plate which is disposed on a rear side of the display panel and supports a light source on a front surface of the support plate; and
a support member which is disposed between the support plate and the display panel, which is provided along an edge portion of the support plate, and which includes a square pipe with a rectangular cross section orthogonal to an axial direction of the square pipe,
wherein the square pipe comprises:
a first side part which is fixed at an edge part of the front surface of the support plate;
a second side part which is opposite to the first side part and located close to the display panel;
a third side part which connects the first side part and the second side part; and
a fourth side part which is opposite to the third side part and located closer to a center part of the support plate than the third side part and connects the first side part and the second side part, and
the support member is made up of a plurality of sheet metal members.

2. The display apparatus according to claim 1, wherein the plurality of sheet metal members includes:
a first sheet metal member which comprises at least the first side part, the second side part, and the third side part; and
a second sheet metal member which comprises at least the fourth side part.

3. The display apparatus according to claim 2, wherein the support member further comprises an extending part extending toward the center part of the support plate parallel to the first side part from a connection part of the first side part and the fourth side part,
the first side part and the extending part are fixed at the edge part of the front surface of the support plate,
the first sheet metal member further comprises the extending part and a part of the fourth side part close to the second side part, in addition to the first side part, the second side part and the third side part,
the second sheet metal member further comprises the extending part or comprises the extending part and a part of the second side part close to the fourth side part, in addition to the fourth side part, and
the first sheet metal member and the second sheet metal member are joined at a overlapped part of the first sheet metal member and the second sheet metal member.

4. The display apparatus according to claim 3, wherein the support member further comprises a protruding part protruding to the display panel from an edge part of the extending part which is close to a center part of the support plate, and
the protruding part is made up of the first sheet metal member and the second sheet metal member.

5. The display apparatus according to claim 1, wherein a panel support part is provided between the support member and the display panel to support the display panel,
the panel support part includes a front panel part opposite to the second side part and a side panel part connected to the front panel part approximately perpendicular to the front panel part,
the third side part is provided with a holding hole configured to hold the panel support part, and
the side panel part of the panel support part has a fitting part which is fitted to the holding hole.

6. The display apparatus according to claim 5, wherein the second side part has a positioning protrusion configured to protrude to the front panel part and position the panel support part, and
the front panel part of the panel support part is provided with a positioning hole with which the positioning protrusion is engaged.

7. The display apparatus according to claim 6, wherein the plurality of sheet metal members comprises:
a first sheet metal member which comprises at least the first side part, the second side part, and the third side part; and
a second sheet metal member which comprises at least the fourth side part, and
the positioning protrusion is formed by cutting and raising a part of the third side part of the first metal sheet member.

8. The display apparatus according to claim 1, wherein
a panel support part is provided between the support member and the display panel to support the display panel,
the panel support part includes a front panel part opposite to the second side part and a side panel part connected to the front panel part approximately perpendicular to the front panel part,
the second side part has a positioning protrusion configured to protrude to the front panel part and position the panel support part, and
the front panel part of the panel support part is provided with a positioning hole with which the positioning protrusion is engaged.

9. The display apparatus according to claim 8, wherein the plurality of sheet metal members comprises:
a first sheet metal member which comprises at least the first side part, the second side part, and the third side part; and
a second sheet metal member which comprises at least the fourth side part, and
the positioning protrusion is formed by cutting and raising a part of the third side part of the first metal sheet member.

10. The display apparatus according to claim 1, wherein
an optical sheet is provided between the support member and the display panel, and
the display apparatus further comprises:
a holding axis holding the optical sheet which penetrates the optical sheet and the second side part in a front-rear direction.

11. The display apparatus according to claim 1, wherein the support plate is made up of a plurality of plate members.

12. The display apparatus according to claim 1, wherein
the support member further comprises an extending part extending toward the center part of the support plate parallel to the first side part from a connection part of the first side part and the fourth side part, and
the first side part and the extending part are fixed at the edge part of the front surface of the support plate.

13. The display apparatus according to claim 12, wherein the support member further includes a protruding part protruding to the display panel from an edge part of the extending part which is close to a center part of the support plate.

* * * * *